E. V. ANDERSON.
VALVE DEVICE FOR GAS OR FLUID METERS.
APPLICATION FILED MAR. 23, 1914.
1,120,262.　　　　　　　　　　　　Patented Dec. 8, 1914.
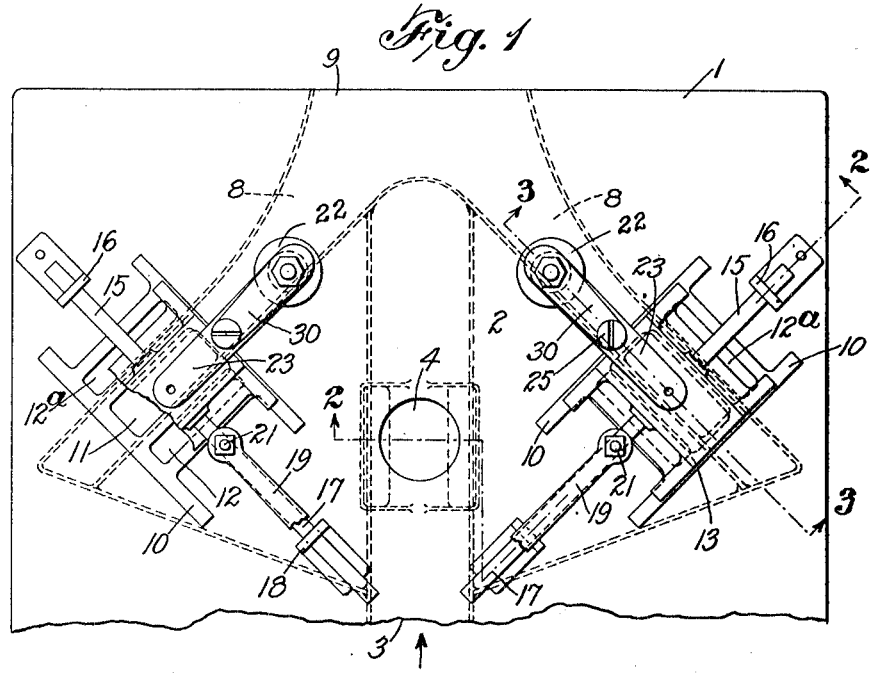
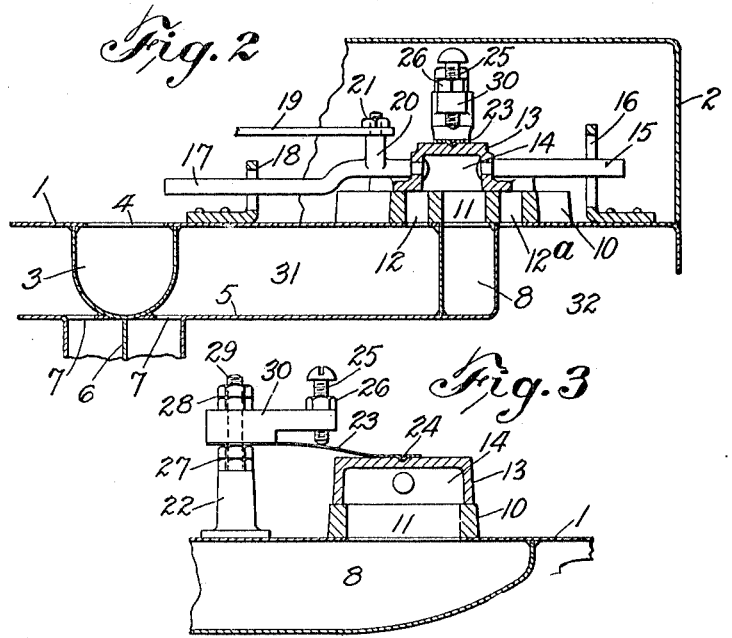
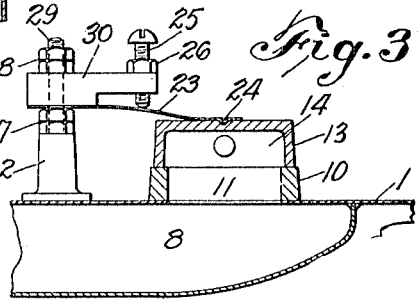

UNITED STATES PATENT OFFICE.

EDGAR V. ANDERSON, OF POUGHKEEPSIE, NEW YORK.

VALVE DEVICE FOR GAS OR FLUID METERS.

1,120,262.   Specification of Letters Patent.   Patented Dec. 8, 1914.

Application filed March 23, 1914. Serial No. 826,592.

*To all whom it may concern:*

Be it known that I, EDGAR V. ANDERSON, a citizen of the United States, residing at Poughkeepsie, in the county of Dutchess and State of New York, have invented certain new and useful Improvements in Valve Devices for Gas or Fluid Meters, of which the following is a specification, reference being had therein to the accompanying drawing.

My present invention relates to certain new and useful improvements in valve devices for gas meters particularly, although the invention may be applied to other fluid or liquid meters.

The object of the invention is to provide tension means for making a tight joint at all times between the meter valve and its seat and thus prevent the meter from running slow and the passage of gas therethrough without its being properly measured and registered.

The invention, therefore, consists essentially in the construction, arrangement and combination of the various parts, substantially as will be hereinafter described and then more particularly pointed out in the claims.

In the accompanying drawing illustrating my invention: Figure 1 is a partial plan view of a pair of gas meter valves provided with my improved tension devices for said valves. Fig. 2 is an enlarged cross section on the line 2, 2 of Fig. 1. Fig. 3 is a partial section on the line 3, 3 of Fig. 1.

Similar characters of reference designate corresponding parts throughout the different figures of the drawing.

Although my invention is applicable to gas and other meters having a great variety of structures, yet I have illustrated herein, simply by way of example and with no idea of being restricted thereto, one form of gas meter in which I have represented only a few of the parts, it being unnecessary to illustrate the entire device, and among said few parts, 1 denotes a horizontal table which ordinarily is employed in this form of gas meter to support the valve devices, and to assist in subdividing the meter box or casing into chambers, there being above the table 1 a chamber 2 which receives gas through an opening 4 from supply passage 3, which enters the meter in any desired manner, the details of which it is unnecessary to describe. In this class of meters, valves are employed for transferring the gas from the chamber 2 to the service or house pipes which lead to the consumer, said service pipes being connected to a meter outlet pipe 9, which forks into two branches 8, 8 that run horizontally and at an angle to each other beneath the table 1. On the table 1 are valve seats 10, each having therein ports 11, 12 and $12^a$, that register with openings in the table 1, ports 12 and $12^a$ furnishing a communication between chamber 2 and the spaces below the table 1, port 11 being the middle port and opening into the delivery passages 8, connecting this passage alternately to ports 12 and $12^a$ according to the position of valve 13, while the ports 12 and $12^a$ are two in number, port 12 being on one side of the port 11 and leading into a passage 31, having in the bottom thereof an opening 7 through which the gas passes downwardly into the lower part of the meter on one side of a central partition 6, and into the inside of a leather diaphragm, while the other port $12^a$ communicates with the space 32 in the lower part of the meter below the table 1. Without furnishing any further details of the construction and arrangement of the parts of the meter, it may be sufficient to suggest that in certain gas meters constructed for measuring the amount of gas consumed in buildings, the above mentioned lower portion of the meter below the table 1 is subdivided into certain compartments with diaphragms and other parts; at one time when the valve connects ports 11 and 12, the gas passes through the port 12 from the passage 31 through passage 14 in valve 13 into port 11, and then into passage 8 and on to the service pipes; while at another time the valve 13, shifting its position on the valve seat 10, allows gas to pass from chamber 32, below the table 1, through port $12^a$ and into port 11, by the means of space or passage 14 in valve 13, the gas passing through port 11 into passage 8 and then into the service pipes; moreover while the valve 13 covers and puts into communication ports 12 and 11, passing the gas from the inside of the diaphragm through passages 7 and 31 into the outlet passage 8, gas is passing to the lower chamber 32 outside of the diaphragm from chamber 2 through port $12^a$. When the gas is entirely exhausted from the inside of the diaphragm with which passage 7 communicates, the operation of a crank shaft (not shown), reverses the position of the valve 13 through the motion imparted to the rod 19, so that the valve 13 throws ports 11 and 12ª into communication and opens up port 12 to space 2. In this position gas is being exhausted from the outside of the diaphragm, space 32, through port 12ª, the space 14 in valve 13, port 11 and into the gas outlet passages 8 into the service pipes, and at the same time gas is passing from chamber 2 through port 12 to the passage 31 and passage 7 to the inside of the meter diaphragm. When all the gas is exhausted from space 32 through the passages as described, to passage 8 and outlet 9 the position of valve 13 is again reversed and this cycle of operations takes place as long as there is a demand for gas beyond outlet 9. Again the two sets of valve mechanisms always operate on the opposite ports; that is, while valve 13 of one set covers ports 11 and 12ª, valve 13 of the other set covers ports 11 and 12. But with the particular construction and operation of the gas meter whereby the gas passes through the chambers 2 and 32 and through the other chambers and passages leading to the consumer, this invention has nothing to do, and parts of the same are only referred to here briefly for the purpose of enabling the construction and object of the valve device to be brought out more prominently and lucidly.

The valve employed with each seat 10 is a D-valve 13 having an interior recess 14. It has a reciprocating movement across the face of the seat 10 and consequently over the ports 11, 12 and 12ª. As ordinarily constructed, the valve 13 is made of an alloy of tin and antimony; the valve seat 10 being likewise of tin, antimony and a small percentage of lead, these compositions being commonly known as white metal. The alloy containing lead, of which alloy the valve seat is made, is a trifle softer than that without lead. Two reasons may be assigned for making the valve seat softer than the valve. A more even grinding is effected by using two compositions, one softer than the other, and consequently the two degrees of hardness also prevent a squeaking noise during operation if the surface happens to become dry. The white metal is used in preference to other soft metals because on it the contents of natural and artificial illuminating gas have no deteriorating effect. Brass is attacked by ammonia in coal gas, and iron is attacked by the water held in suspension in artificial gas, and therefore these materials are not suitable for use as a valve or valve seat.

During the reciprocation of the valve 13 back and forth over the seat 10, deposits may occur on the valve seat and on the general mechanism. The same may be of naphthalene, light or heavy oils, water, tar, or particles of dirt, or foreign substances, all of which deposits are likely to interfere with the valve operation. These D-valves 13 as at present employed in gas meters of the kind of which I am speaking, are valves which rest merely with their own weight upon the seats, as they slide back and forth over the same, and which depend only on their own weight to push off or grind off these foreign deposits, and they are likely to lift up over the deposits, thereby allowing gas to leak through the valve from the inlet to the outlet ports without entering the chambers and diaphragms ordinarily employed in the other parts of the meter box, and consequently without showing any indication on the register. It is to avoid such leakage and such irregular movement of the D-valve and to make it possible for the valve to continuously grind and keep close and firm upon its seat at all times that my invention has been devised.

Before specifically mentioning the device of the invention, I may further explain, what is now in common use, that the D-valve 13 is provided at one end with a stem 15 loosely playing through a guide 16 fixed on the table 1, and that at the other end the valve 13 is provided with another stem 17 in alinement with the stem 15 and playing loosely through another guide 18 bolted or otherwise secured to the table 1. The stem 17 has a lug 20 to which is attached a rod 19 held on the lug 20 by a nut 21. This rod 19 controls the motion of the valves 13, receiving its motive power from mechanism not shown.

In the particular example of the invention illustrated in the drawings, I have shown two of the D-valves, and they are placed at an angle to each other, as shown in Fig. 1, their lines of travel being at right angles to each other, but all this showing is simply for the purpose of more easily explaining the idea of the invention, and I do not wish to be restricted thereto.

Proceeding now to set forth the details of the invention, a post or standard 22 is soldered or otherwise firmly attached to the table 1 at a point not far from the valve seat 10. The point of attachment of the post 22 is in a line at right angles to the line of travel of the valve and directly opposite the center of the center port 11 in the seat 10, and at a distance, say, from the center of the valve of about three times the length of the travel of the valve, though this may vary within wide limits. The upper part of the post 22 is screw-threaded and provided with lock nuts 27 and lock nuts 28. Between these nuts 27 and 28, a spring 23 and an arm 30 are securely held. Both are perforated to permit them to receive the screw-threaded stem 29. The arm 30 is above the spring 23 and the outer end is thinner than the inner, and carries a set-screw 25 which bears on spring 23. The spring 23 curves forwardly and downwardly and presses upon the top of the valve 13, it having near its tip a small lug or projection 24 which enters a little depression in the top of the valve and thus affords a loose connection between the end of the spring and the valve. Obviously during the movement of the valve, the spring 23 has a pivotal action on the screw-threaded part 29 of the post 22 and easily moves back and forth. The set-screw 25 in arm 30 can be adjusted since its lower end bears on the spring 23 and tension of the spring 23 on the valve can be increased or diminished. The screw 25 is held at any desired position by means of a lock-nut 26. This spring device has, therefore, an adjustable pressure on the valve. It exerts an extra pressure on the valve when the valve lifts up over any obstruction on the valve seat, thus putting an increased pressure on the valve and increasing its power to grind off the foreign substance. By means of the light spring adjustment, the higher the valve lifts, the greater the spring tension, and therefore the greater the increase in pressure on the valve, and the greater its ability to grind off the foreign substance.

With the old mechanism now in use, which has no presser device, only the weight of the valve itself can exert a pressure and this pressure is constant and cannot increase since it is exerted only by the weight of the valve. Again it should be remembered that a valve of the kind which I am describing makes several thousand reciprocations for each one thousand cubic feet of gas that passes, and hence the wear on the valve and valve seat is likely to be considerable. The power for moving the valve reverses its direction of motion at each end of the stroke, and the tendency of the valve is to lift or press down, unless the power is applied exactly on the horizontal plane of the center of gravity of the valve. With the additional spring pressure acting downward over the center of the valve, as results from the use of my improved presser device, this tendency to lift or press down is minimized, and for this reason the extra spring pressure allows an even and continuous grinding of the valve and seat. It eliminates rocking valves and prevents any tendency of the meter to run slow by preventing leaky parts and the lifting of the valve from the seat.

The construction of a continuous grinding device, such as I have herein described, operating with a reciprocating action at the end of a lever arm having a length of about three times the valve stroke, converts practically all the extra pressure in excess of the pressure of the weight of the valve into useful or grinding pressure and minimizes friction except on the contact surfaces between the valve and the valve seat. The valve now in common use is free to lift from its seat, and does so either by jarring or turning the meter on its face or back or upside down, as often occurs in the rough handling of meters which are being carried to and from meter shops to the consumer's premises and in transportation from the factories to the gas companies' shops. Not only the jarring away of the valves from the seats often happens, but stray pieces of solder, tin, clippings, leather, twine, and other foreign substances, often get between the surfaces so that when the meter goes into use, the valve not being able to seat the meter will run slow and permanent damage is also often done to the valve mechanism from these causes.

Many changes in the precise construction, arrangement and combination of the parts may obviously be made without exceeding the scope of the invention.

Having thus described my invention, what I claim as new and desire to secure by Letters Patent, is:—

1. In a valve mechanism for gas and other fluid meters, the combination with a valve seat having ports therein, of a reciprocating valve, and a tension device for pressing said valve to its seat.

2. In a valve mechanism for gas and other fluid meters, the combination with a valve seat having ports therein, of a D-valve sliding thereover, and a tension device for pressing said valve to its seat.

3. In a valve mechanism for gas and other fluid meters, the combination with a valve seat having ports, of a valve device, means for guiding the valve in its reciprocation, and a spring device pressing upon the valve so as to hold the same more closely to its seat.

4. In a valve mechanism for gas and other fluid meters, the combination with a valve seat having ports, of a reciprocating D-valve, means for guiding the valve in its reciprocations, and a spring device pressing upon the valve so as to hold the same more closely to its seat.

5. In a valve mechanism for gas and other fluid meters, the combination of a valve seat, of a D-valve sliding thereover, the valve and the seat being of different degrees of hardness, and a spring device pressing on the valve for holding the latter with a light pressure upon its seat.

6. In a valve mechanism for gas and other fluid meters, the combination with a seat having a plurality of ports, of a D-valve sliding on said seat, with a continuous grinding action, the valve and the seat being of different degrees of hardness, and a spring device exerting a light pressure upon the valve so as to keep the same in closer touch with its seat.

7. In a valve mechanism for gas and other fluid meters, the combination with a valve seat having a series of ports therein, of a D-valve sliding on said seat with a continuous grinding action, the material of which the seat is composed being softer than that of which the valve is made, and a presser device acting on the valve to hold the same more closely to its seat.

8. In a valve mechanism for gas and other fluid meters, the combination with a seat having a series of ports, of a D-valve sliding thereon, a spring bearing on the valve to hold the same more closely on its seat, said spring loosely engaging the valve and means for adjusting the tension of the spring.

9. In a valve mechanism for gas and other fluid meters, the combination with a seat having a series of ports, a valve sliding thereon with a continuous grinding action, a spring bearing on the valve and having a lug loosely engaging the valve, a post for supporting said spring in a position at right angles to the line of travel of the valve, and means for adjusting the tension of the spring.

10. In a valve mechanism for gas and other fluid meters, the combination of a seat having a series of ports therein, a valve sliding on said seat, and a tension device for the valve consisting of a spring engaging the valve, a post supporting the spring, and a set-screw carried above the spring and pressing thereon.

11. In a valve mechanism for gas and other fluid meters, the combination with a seat having a series of ports, a valve sliding on said seat, the material of the seat being softer than that of the valve, so that the action of the valve may be a continuous grinding action, means for guiding the valve in its reciprocatory movement, and a presser device for the valve consisting of a spring with an adjustable tension bearing on the valve.

12. In a valve mechanism for gas and other fluid meters, the combination of a valve seat, of a D-valve sliding thereover, the valve and the seat being of different degrees of hardness, and a spring device pressing on the valve for holding the latter with a light pressure upon its seat.

13. In a valve mechanism for gas and other fluid meters, the combination with a seat having a plurality of ports, of a D-valve sliding on said seat, with a continuous grinding action, the valve and the seat having degrees of hardness, and a spring device exerting a light pressure upon the valve so as to keep the same in closer touch with its seat.

In testimony whereof I affix my signature in the presence of two witnesses.

EDGAR V. ANDERSON.

Witnesses:
FRANK H. VICK, Jr.,
ESTELLE M. BRYMAN.